(12) United States Patent
Wilkinson et al.

(10) Patent No.: US 7,448,685 B2
(45) Date of Patent: Nov. 11, 2008

(54) EASY LIFT MECHANISM FOR VEHICLE SEATS

(76) Inventors: Frederick Wilkinson, 4299 Potts Rd., Fowlerville, MI (US) 48836; John Taylor, 6415 OakBrook Dr., Ypsilanti, MI (US) 48197; Ajay Sonar, 39072 Polo Club Dr., Farmington Hills, MI (US) 48835

( * ) Notice: Subject to any disclaimer, the term of this patent is extended or adjusted under 35 U.S.C. 154(b) by 484 days.

(21) Appl. No.: 11/007,832

(22) Filed: Dec. 8, 2004

(65) Prior Publication Data

US 2005/0168036 A1 Aug. 4, 2005

Related U.S. Application Data

(60) Provisional application No. 60/527,880, filed on Dec. 8, 2003.

(51) Int. Cl.
*B60N 2/02* (2006.01)

(52) U.S. Cl. .................................. 297/378.12

(58) Field of Classification Search ............. 297/378.1, 297/378.12, 378.14, 183.1, 183.6
See application file for complete search history.

(56) References Cited

U.S. PATENT DOCUMENTS

| | | |
|---|---|---|
| 3,145,054 A | 8/1964 | Sopko, Jr. |
| 3,326,601 A | 6/1967 | Vanderbilt et al. |
| 3,652,126 A | 3/1972 | Folling |
| 3,867,732 A | 2/1975 | Morrell |
| 3,929,374 A | 12/1975 | Hogan et al. |
| 4,162,807 A | 7/1979 | Yoshimura |
| 4,316,631 A | 2/1982 | Lenz et al. |
| 4,518,200 A | 5/1985 | Armstrong |
| 4,671,569 A | 6/1987 | Kazaoka et al. |
| 4,789,202 A | 12/1988 | Alter |
| 4,909,568 A | 3/1990 | Dal Monte |
| 4,965,899 A | 10/1990 | Sekido et al. |
| 5,007,677 A | 4/1991 | Ozawa et al. |
| 5,197,780 A | 3/1993 | Coughlin |
| 5,286,087 A | 2/1994 | Elton |

(Continued)

FOREIGN PATENT DOCUMENTS

DE   197 37 270 C1   3/1999

(Continued)

OTHER PUBLICATIONS

The PCT International Search Report, based on International Application No. PCT/US03/35565, date of mailing of the International Search Report May 17, 2004, (4 pgs.).

*Primary Examiner*—Milton Nelson, Jr.
(74) *Attorney, Agent, or Firm*—Foley & Lardner LLP

(57) ABSTRACT

A method and apparatus for actuating a folding vehicle seat. The apparatus includes a handle remotely and functionally connected to the vehicle seat for moving the seatback from a folded position to an upright or design position. The handle is pivotally mounted on a support bracket and attached to an actuator member interconnecting the handle and the seatback. The actuator member transfers the motion of the handle to a generally "L-shaped" arm which is pivotally mounted to the vehicle seat below the seatback. The L-shaped arm rotates toward the back of the seat as the handle is lifted. As the L-shaped arm moves, it catches a stop or extension member located on the seatback and moves the seatback toward the upright position.

14 Claims, 13 Drawing Sheets

U.S. PATENT DOCUMENTS

| | | | |
|---|---|---|---|
| 5,352,018 A | 10/1994 | Arakawa et al. | |
| 5,425,569 A | 6/1995 | Hayes | |
| 5,507,561 A * | 4/1996 | Fourrey et al. | 297/378.12 |
| 5,651,584 A | 7/1997 | Chenot et al. | |
| 5,658,050 A | 8/1997 | Lorbiecki | |
| 5,671,978 A | 9/1997 | Olsson | |
| 5,673,972 A | 10/1997 | Dudash et al. | |
| 5,697,672 A | 12/1997 | Mitchell | |
| 5,823,620 A | 10/1998 | Le Caz | |
| 5,836,647 A | 11/1998 | Turman | |
| 6,036,265 A | 3/2000 | Cosentino | |
| 6,068,336 A | 5/2000 | Schönauer | |
| 6,089,664 A | 7/2000 | Yoshida | |
| 6,270,158 B1 | 8/2001 | Hong | |
| 6,390,553 B1 | 5/2002 | LeBlanc | |
| 6,435,616 B1 * | 8/2002 | Travis et al. | 297/378.12 |
| 6,450,579 B1 | 9/2002 | Nylander et al. | |
| 6,454,352 B1 | 9/2002 | Konovalov et al. | |
| 6,767,063 B1 * | 7/2004 | Abdella et al. | 297/378.12 |
| 7,137,667 B2 * | 11/2006 | Habedank | 297/378.12 |
| 2001/0022458 A1 | 9/2001 | Küster et al. | |
| 2004/0262971 A1 * | 12/2004 | Hentges et al. | 297/378.12 |

FOREIGN PATENT DOCUMENTS

| | | |
|---|---|---|
| DE | 201 00 018 U1 | 2/2002 |

* cited by examiner

EASY LIFT MECHANISM FOR VEHICLE SEATS

CROSS-REFERENCE TO RELATED PATENT APPLICATIONS

This application is an application claiming the benefit under 35 U.S.C. 119(e) to U.S. Application No. 60/527,880, filed Dec. 8, 2003, incorporated herein by reference in its entirety.

FIELD OF THE INVENTION

The present invention relates generally to the field of vehicles seats. More particularly, the present invention relates to a mechanism for easily and remotely raising and lowering a seatback of a vehicle seat.

BACKGROUND OF THE INVENTION

In various types of automotive seating arrangements, it is frequently desirable, or even necessary, to provide the capability of flattening, folding, collapsing or stowing a seat assembly in order to increase the vehicle's cargo space, accommodate large or bulky items that need to be transported, to use the seat as a load floor, or to otherwise enhance the vehicle's utility or meet the desires or needs of the user. Such capability is especially important in multi-seat vehicles such as but not limited to vans, minivans, recreational vehicles, or multipurpose vehicles, as well as in other similar types of vehicles.

Multi-seat vehicles typically have middle (commonly a second row) and rear (commonly a third row) vehicles seats that are placed rearwardly of the driver's and front passenger's vehicle seats (first row). The seats are normally bench-style seats or captain-style seats but may be of any particular design. Often, the second and third row seats are selectively removable and replaceable through a large rear or side door in order to ready the vehicle for carrying cargo. Removal and replacement of these vehicle seats tends to be somewhat difficult and in some instances may require a considerable amount of effort on the part of the user, especially with respect to the middle row vehicle seat.

To overcome this problem and so as to maximize cargo carrying capabilities, many second and third row seats, and even some first row passenger seats, are configurable from an upright or design position to a substantially horizontal load supporting or folded position. The seat is normally put in the folded position by means of forwardly folding the seatback over the seat cushion. Conversely, the seat is put in the upright position by means of unfolding the seatback. However, often it is difficult for a user to return the seatback to the upright position. Therefore, several methods and mechanisms are known in the art for lifting the seatback member back to an upright position. For example, some seats utilize a simple handle or strap located on the back (i.e. the portion that is topmost when the seatback is folded). Other seats utilize a lever release mechanism located under or on the seat itself.

However, current designs for vehicle seats do not provide a user with the desired ease of use. Prior art designs are often difficult for a vehicle user to easily reach and operate. This is particularly true for vehicle users which are positioned behind the seat which is to be unfolded. The prior art seats are often difficult to lift due to the weight of the seats and the position from which a user must lift the seats. Thus, there is a need for a mechanism for a vehicle seat and a method for operating a vehicle seat for providing convenient access and ease of operation of the seat.

SUMMARY OF THE INVENTION

One embodiment of the invention relates to a seat folding mechanism that allows a user to actuate (move, fold, lift or drop) a vehicle seat from stowed or folded position to a design or upright position. A vehicle seat assembly of one embodiment in accordance with the principles of the present invention provides a handle located remotely from the vehicle seat, and preferably aft (i.e., behind the vehicle seat as compared to the direction an occupant faces while seated in the seat) of the vehicle seat, and in communication with a vehicle seat, whereby the user is able to actuate the vehicle seat so that the seatback is lifted to an upright position by moving the handle from a resting position to a lift position. Further, the handle is preferably pivotally mounted on a support bracket.

For example, in one embodiment the handle has a first end located proximal the seat and a second end located distal the seat. The handle is pivotally mounted to the support bracket at a location on the handle near, but not the second end so that a portion of the handle pivots down and towards the vehicle seat as the handle is lifted up and away from the vehicle seat. The vehicle assembly may include a means for returning the handle to the resting position.

The seat lift mechanism preferably includes an actuator member and the handle is preferably in communication with the actuator member such that movement of the handle causes movement of the actuator member. The actuator member interconnects the seatback to the handle. In one embodiment, the actuator member is an elongated metal plate having a portion curved upwards (towards the ceiling of the vehicle when in use) which is rigidly affixed to the second end of the handle. The handle is in communication with the actuator member whereby the actuator arm transfers the motion of the handle to the seatback as the handle is moved from a resting position to a lifting position.

The actuator member engages the seatback via a lift mechanism. The lift mechanism comprises a generally "L-shaped" arm with a first end connected to the actuator member and a second end having a groove or recess. The L-shaped arm is pivotally affixed to the vehicle seat below the seatback. The seatback has a stop member positioned so that the groove in the L-shaped arm can engage the stop member.

In operation, a user lifts the first end of the handle up which pivots the second end of the handle exerting force on the actuator member and moving the actuator member towards the vehicle seat. The actuator member exerts force on the L-shaped arm, pivoting it so that the groove rotates towards the front of the seat and up (towards the seatback). The groove catches the stop on the seatback and exerts force on the seatback lifting it to the upright position.

In embodiments where the vehicle seat includes a locking device for locking the seatback in position (e.g., such as in the design position or the folded position), the vehicle assembly may include a means for releasing the locking device, for example an electromechanical device controlled by a switch on the handle.

DETAILED DESCRIPTION OF THE PREFERRED EMBODIMENTS

Figure 5:
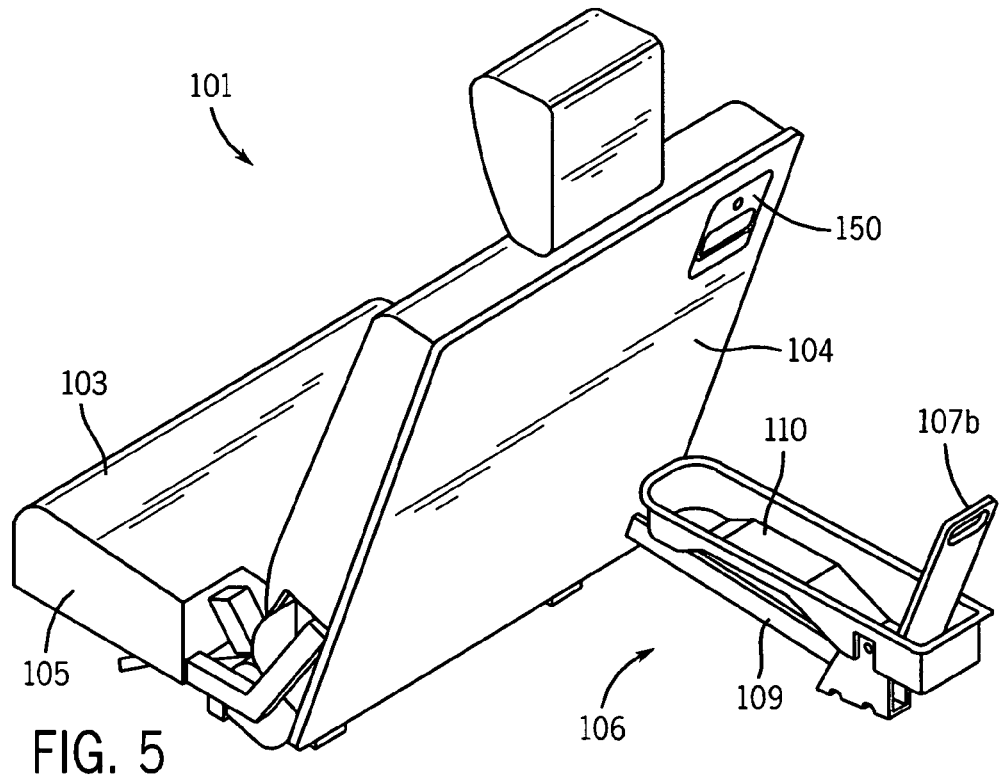
FIG. 5 is a view of an alternative embodiment of the present invention having a housing and rectangular handle where the handle is in the lift position.
Figure 6:
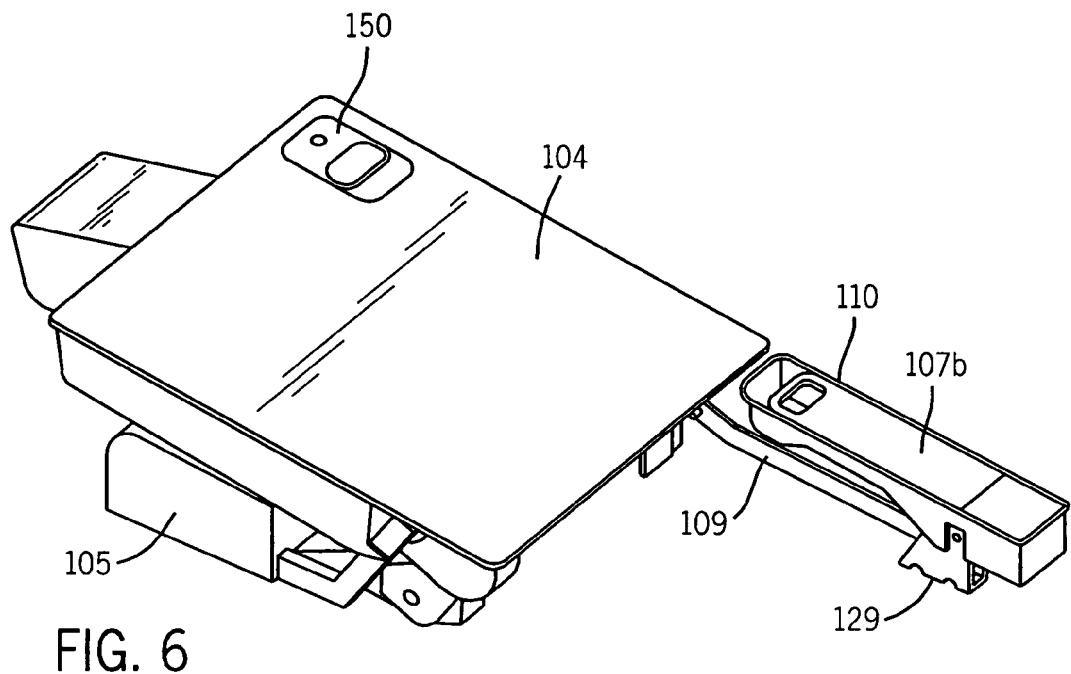
FIG. 6 is a view of the embodiment of FIG. 5, where the handle is in the resting position.
Figure 7:
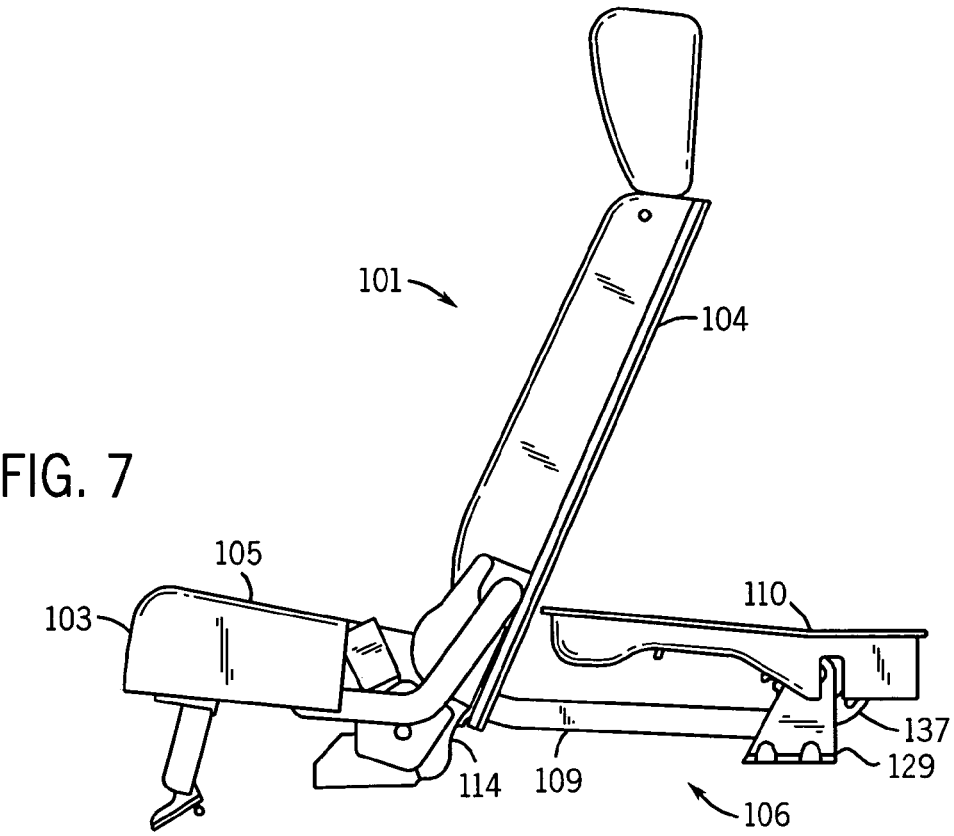
FIG. 7 is a side view of the embodiment of FIG. 6.
Figure 8:
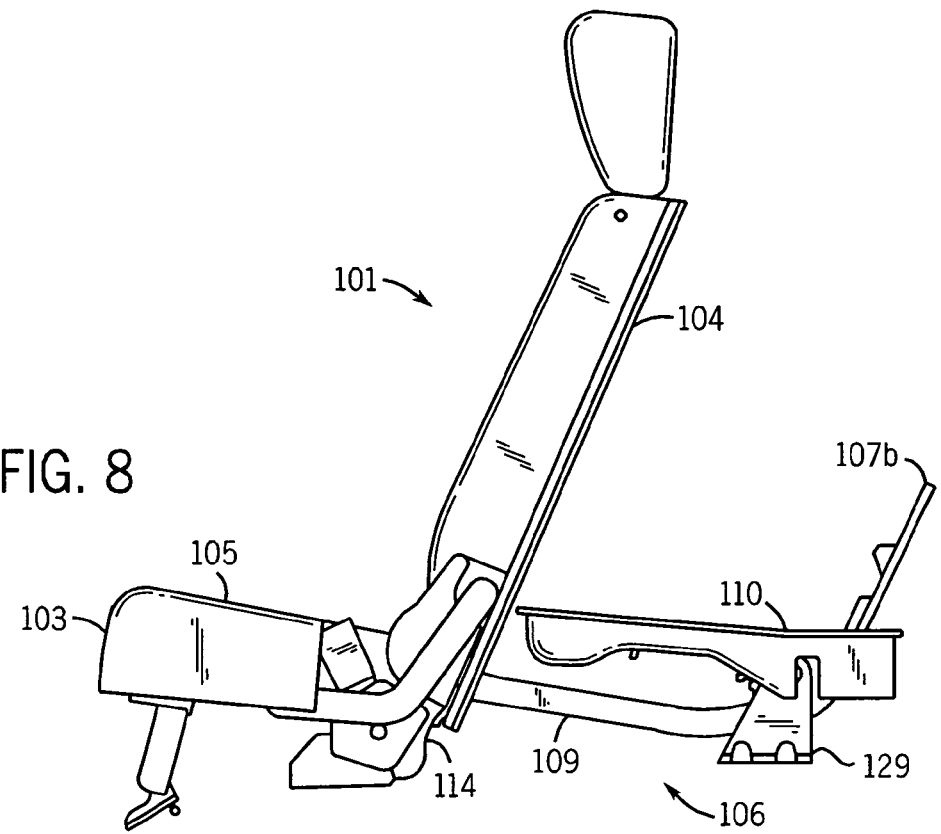
FIG. 8 is a side view of the embodiment of FIG. 5.
Figure 9:
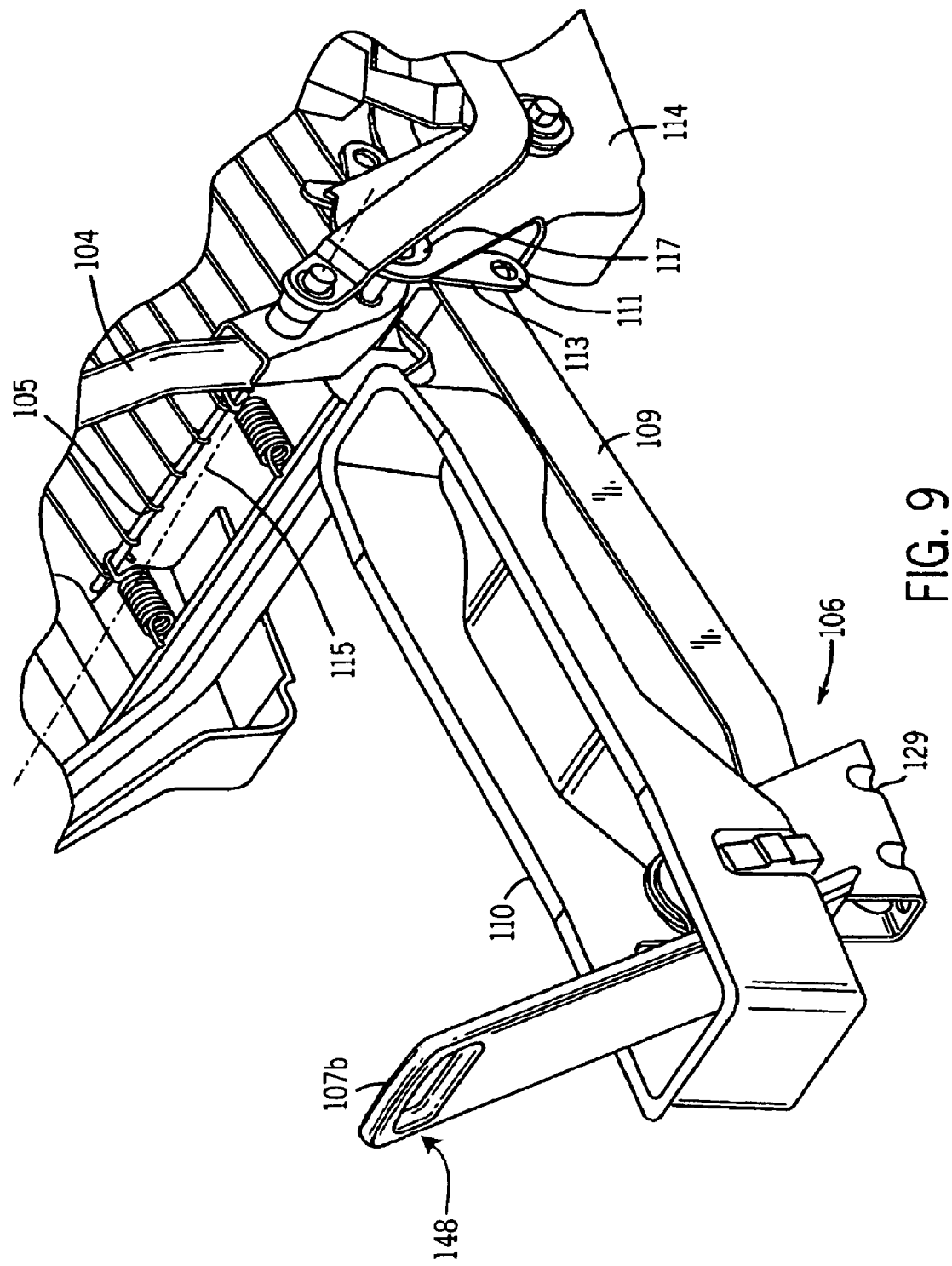
FIG. 9 is a partial perspective view of the handle mechanism of FIG. 5.
Figure 10:
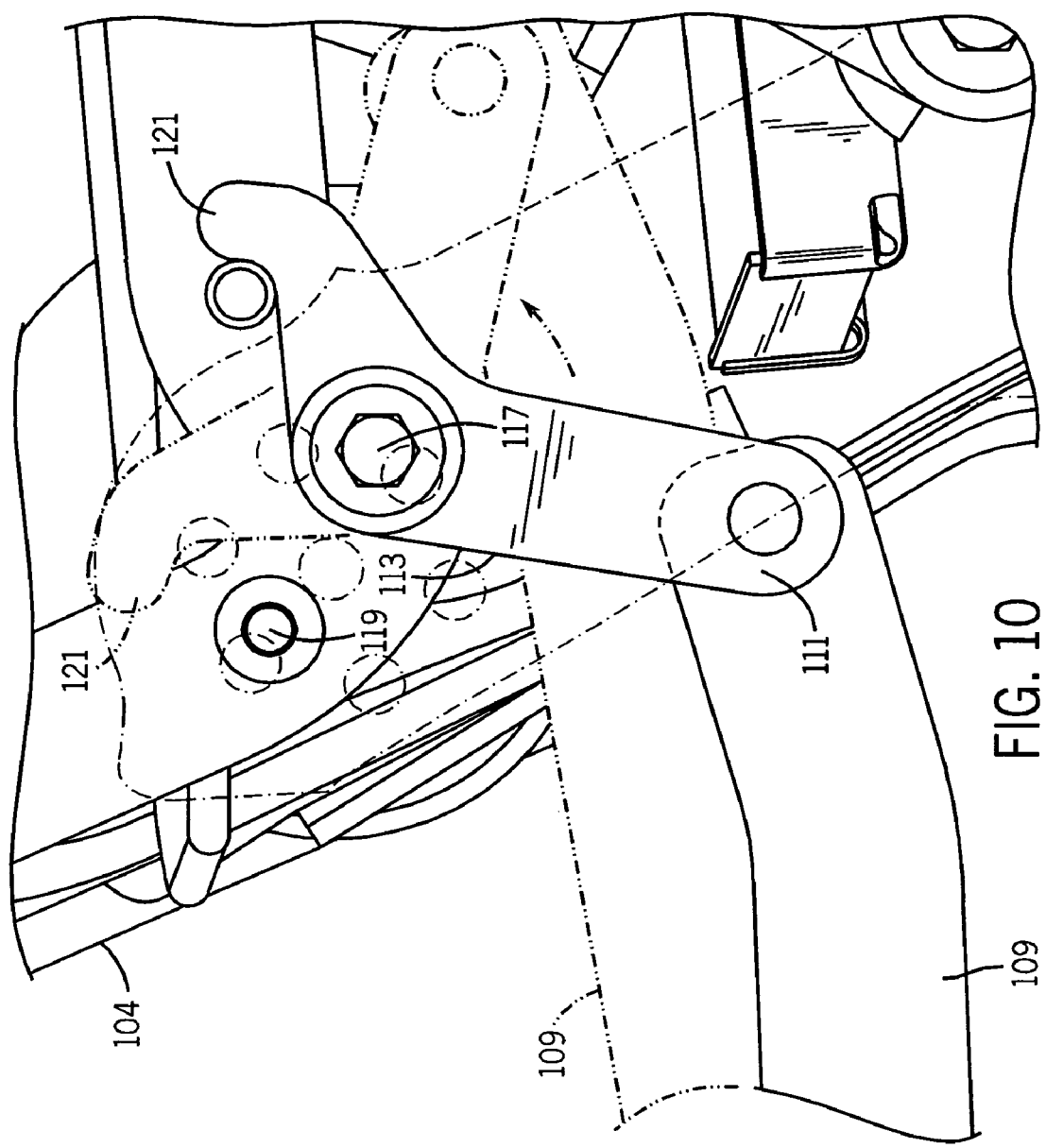
FIG. 10 is a partial detail view of the lifting mechanism and an actuator member in accordance with the principles of the present invention.
Figure 11:
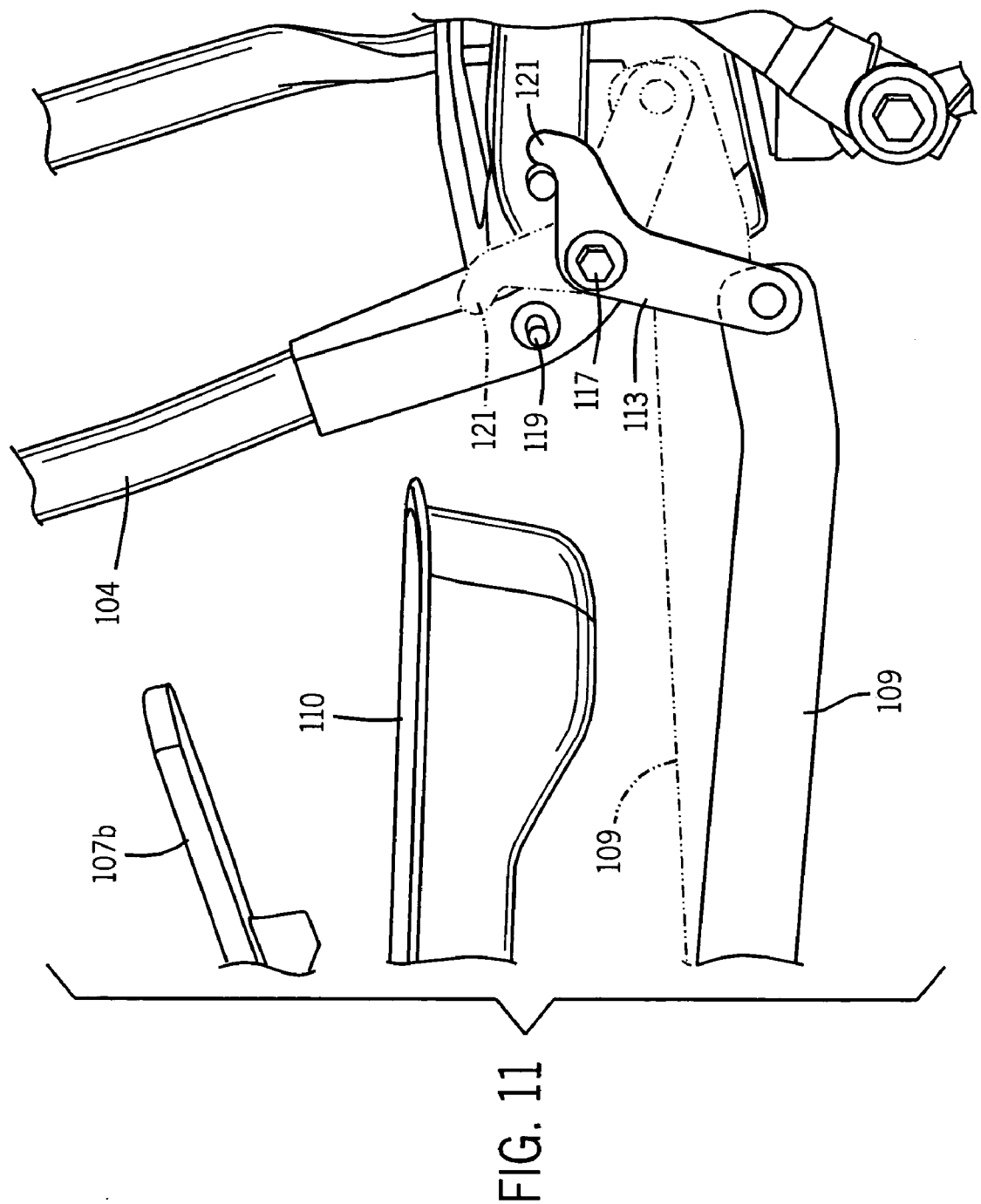
FIG. 11 is a partial plan view of the lifting mechanism in accordance with the principles of the present invention.
Figure 12:
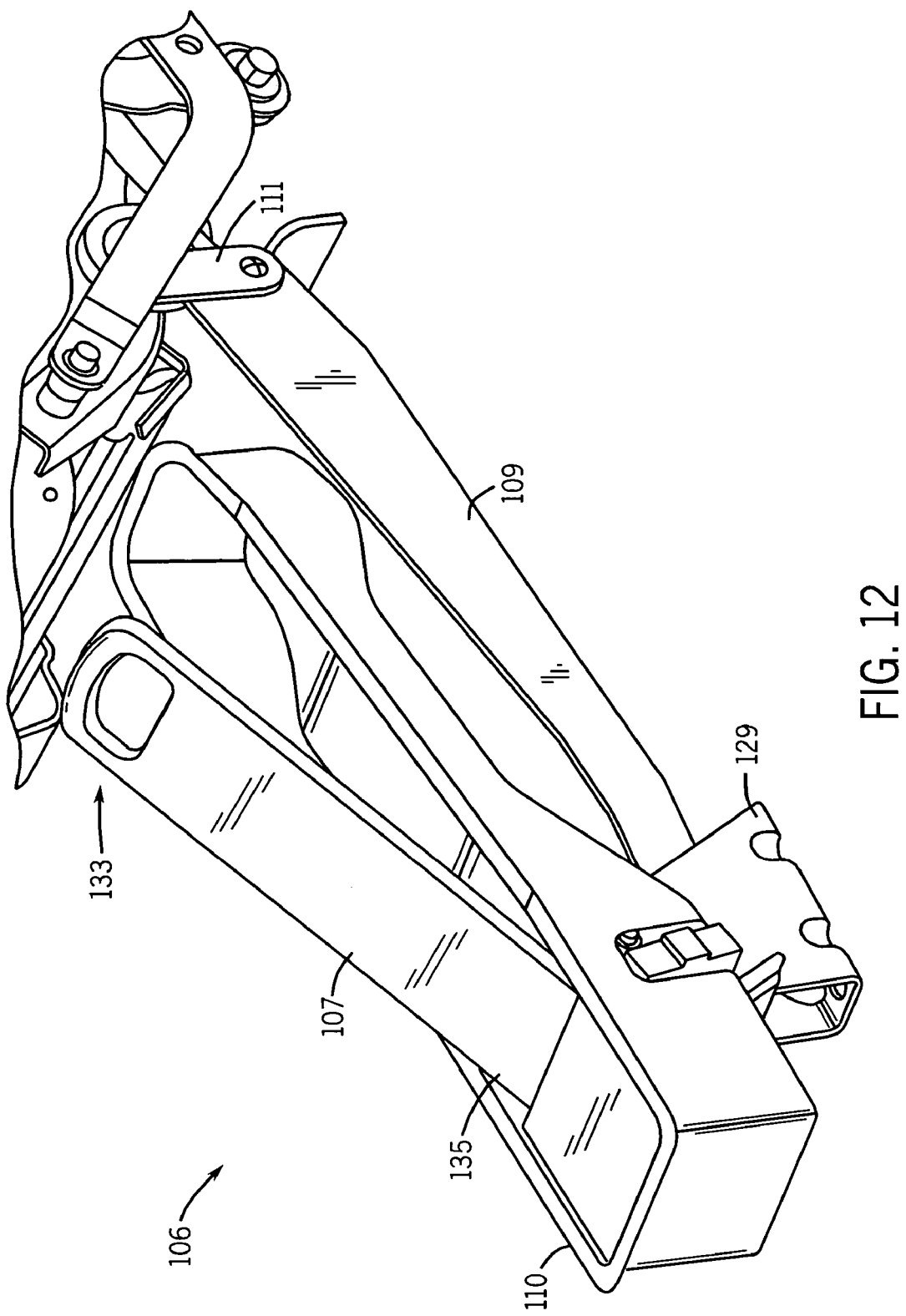
FIG. 12 is a partial perspective view of an alternate embodiment of a lifting assembly in accordance with the principles of the present invention.
Figure 13:
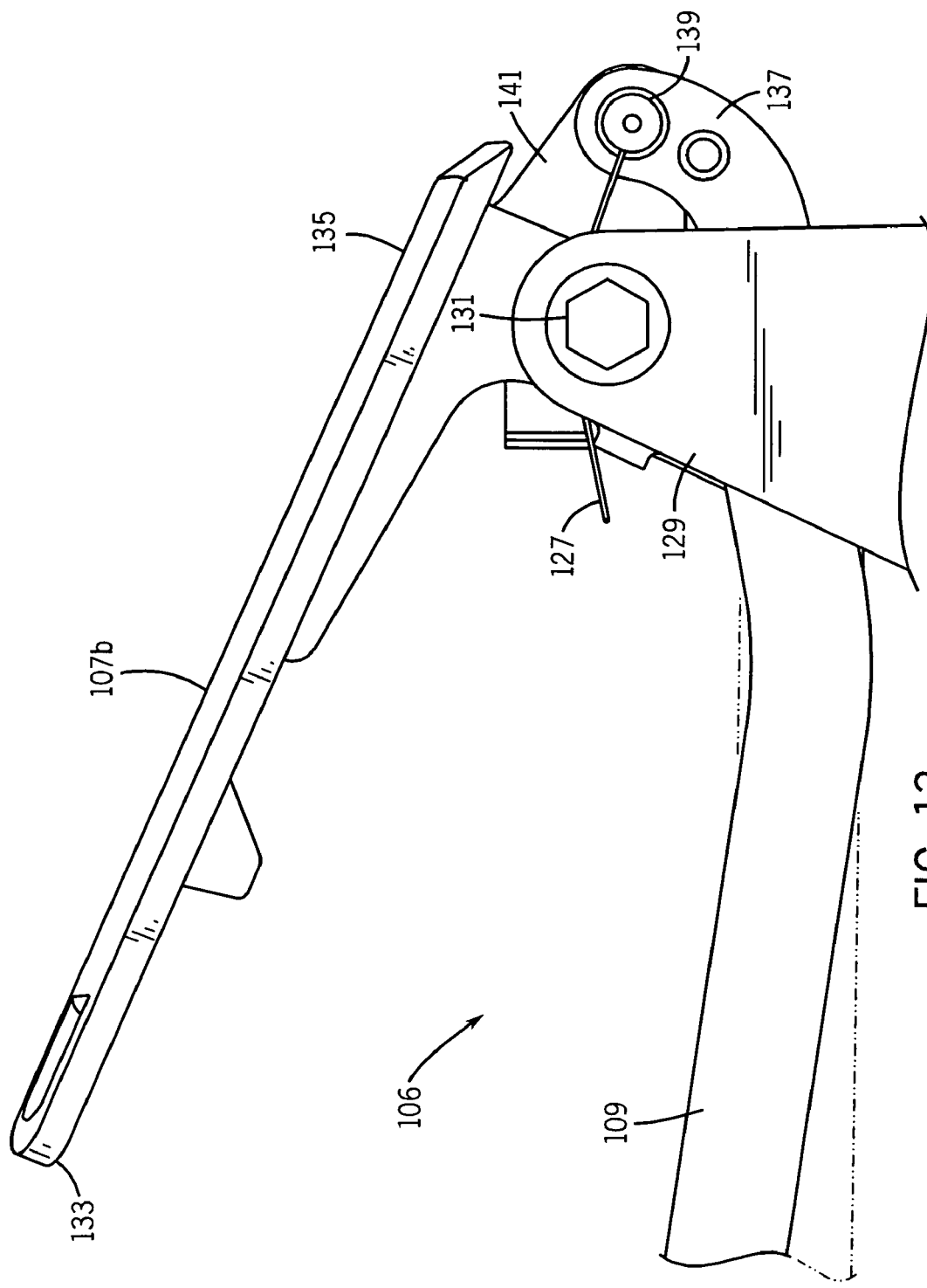
FIG. 13 is a partial plan view of a handle and bracket in accordance with the principles of the present invention.
Figure 14:
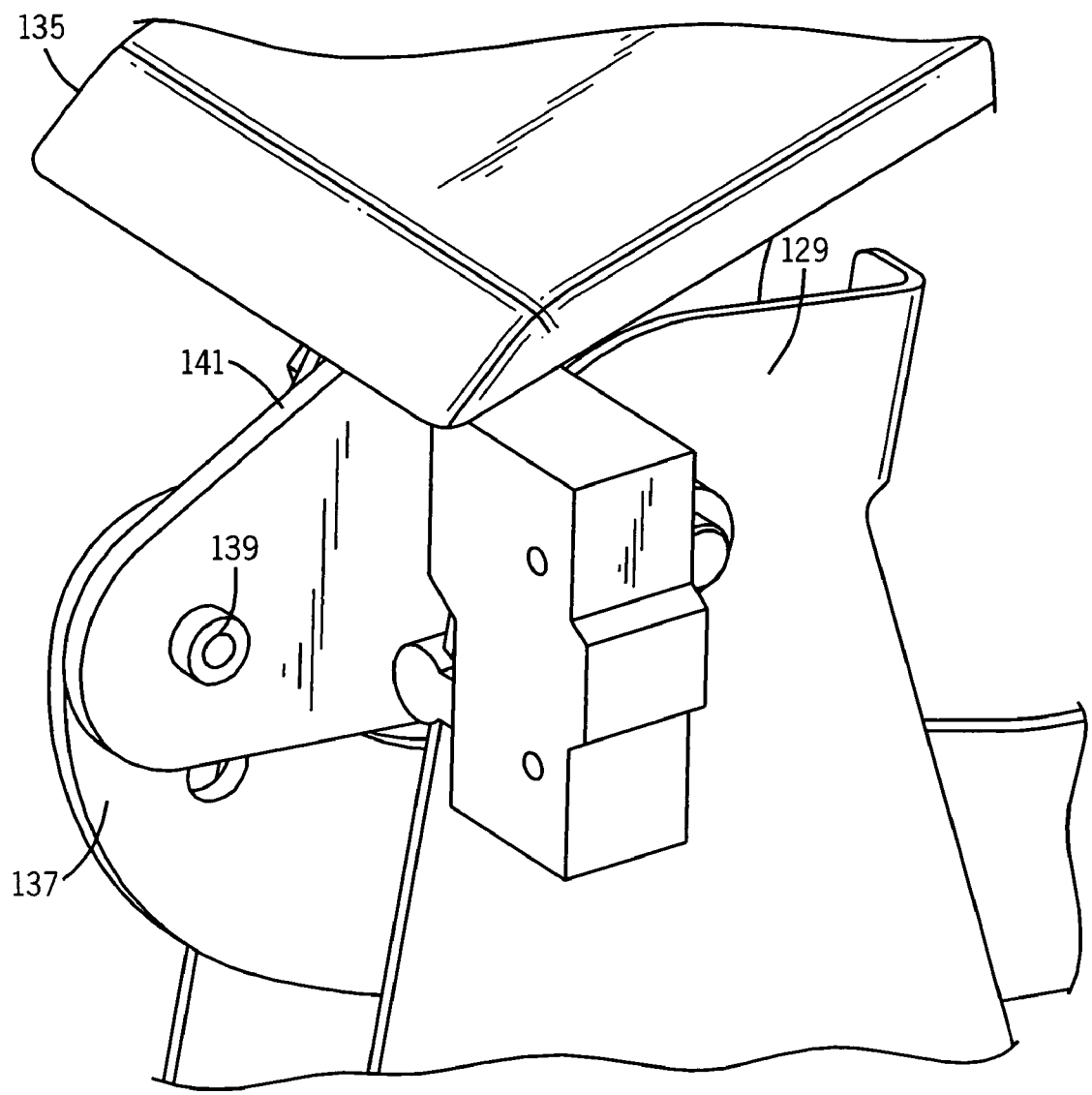
FIG. 14 is a partial perspective view of a handle and actuator member connection and a bracket in accordance with the principles of the present invention.

Referring generally to FIGS. 1-15, the present invention relates to a method and mechanism for actuating a vehicle seat in an easy manner with less effort and providing ergonomic and convenient access. A vehicle seat assembly 101 in accordance with the principles of the present invention provides a handle 107 located aft (i.e., behind the vehicle seat) of and in communication with a vehicle seat 103, whereby a user is able to actuate the vehicle seat 103 so that a seatback 104 of the vehicle seat 103 is lifted to an upright position by moving a handle 107, provided in communication with the seatback 104, from a resting position as shown in FIG. 6 and to a design or lift position as shown in FIG. 5.

Figure 1:
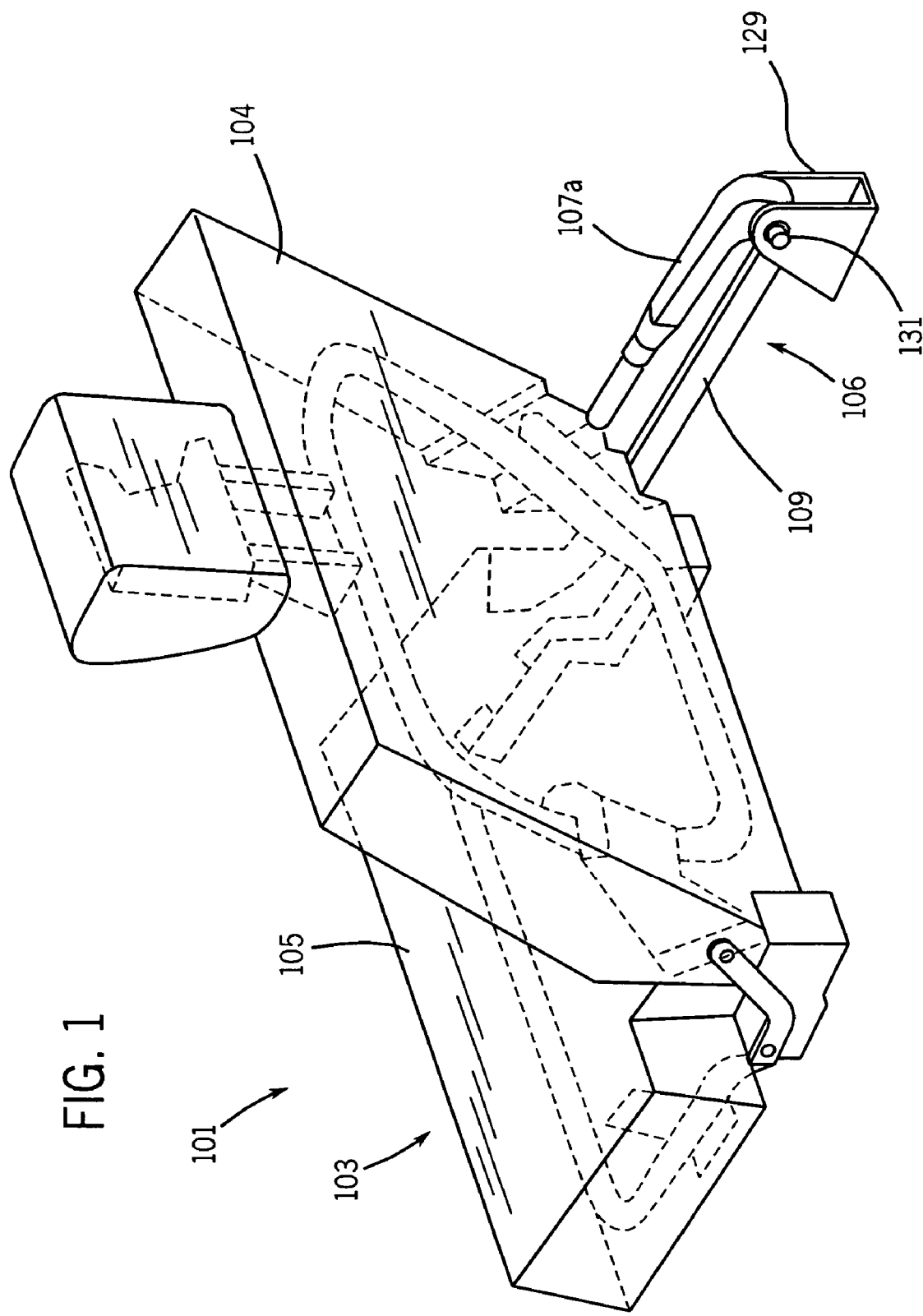
FIG. 1 is a rear perspective view of a vehicle seat system in accordance with the principles of the present invention.
Figure 2:
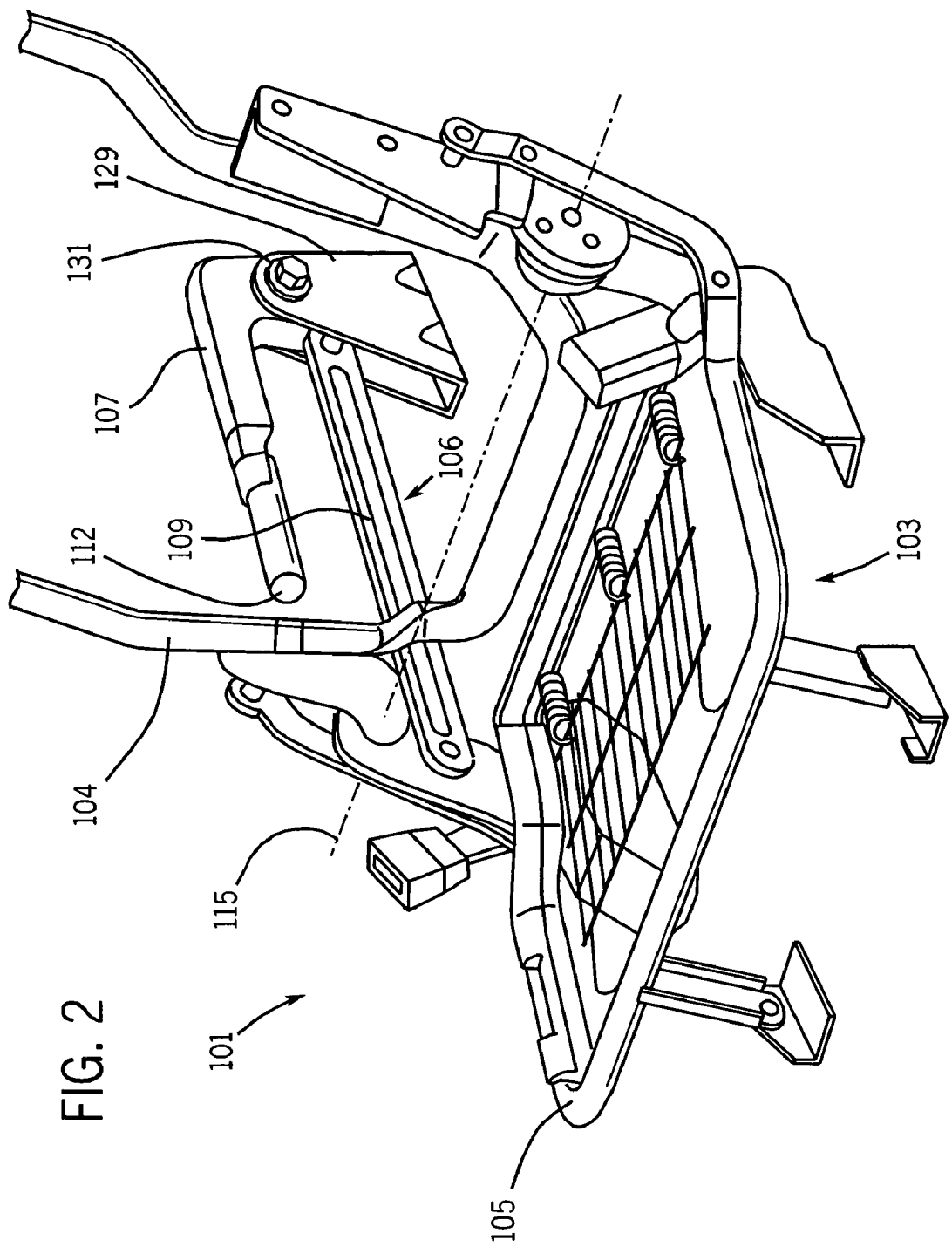
FIG. 2 is a partial front view of a seat according to the present invention.
Figure 3:
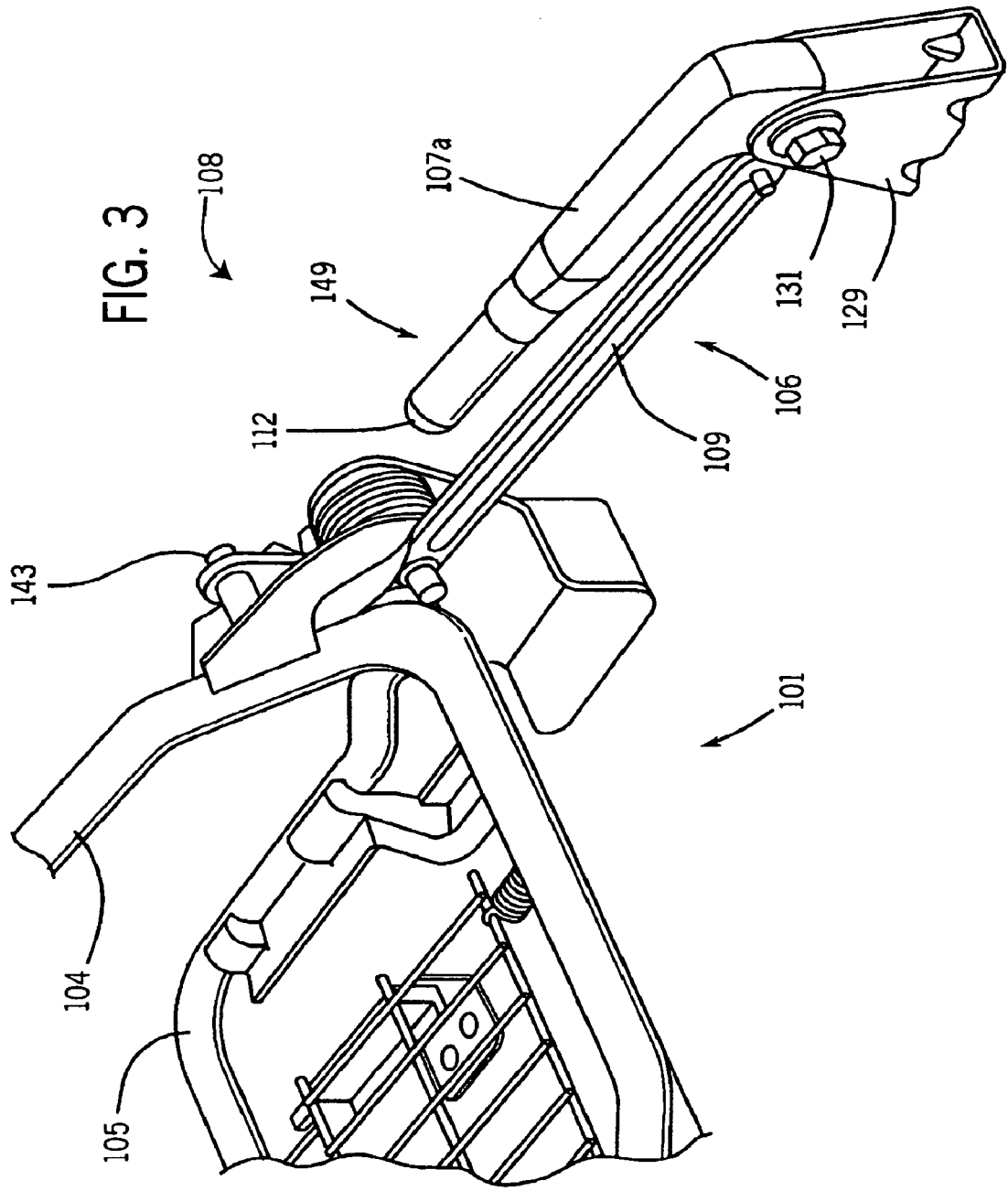
FIG. 3 is a partial close-up view of a seat mechanism including the principles of the present invention.
Figure 4:
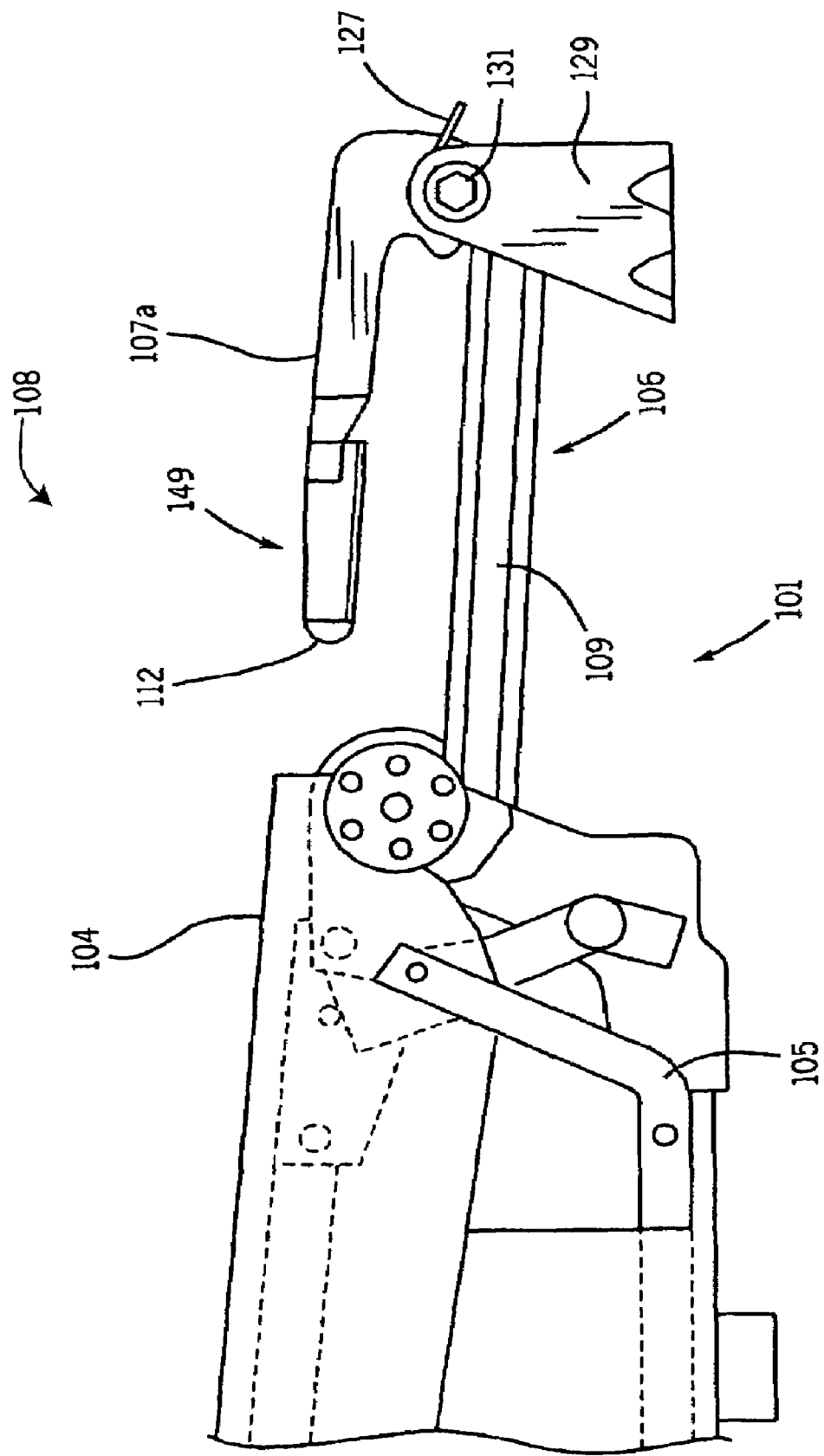
FIG. 4 is a partial side view of a mechanism in accordance with the principles of the present invention.

Referring to vehicle seat assembly 101 as generally shown in FIG. 1, a vehicle seat 103 for use with the present invention may be attached to a vehicle floor (not shown). The vehicle seat 103 has a seatback 104 and a seat cushion 105. The seatback 104 is pivotally attached, for example by means of conventional seat hinges or other recliner mechanism 114, to the seat cushion 105 to allow the seatback 104 to pivot relative to the seat cushion 105. The seatback 104 pivots or folds about a pivot axis 115 (FIG. 2). In a preferred embodiment, the vehicle seat 103 has a means for locking 143 the seatback 104 relative to the seat cushion 105, such as but not limited to a tooth and detent notch mechanism which is capable of releasably locking the seat 103, for example in a folded position (FIG. 5) or in an upright position (FIG. 6). Preferably, the vehicle seat assembly 101 includes a means for releasing 108 the vehicle seat 103 from the locked position.

Figure 15:
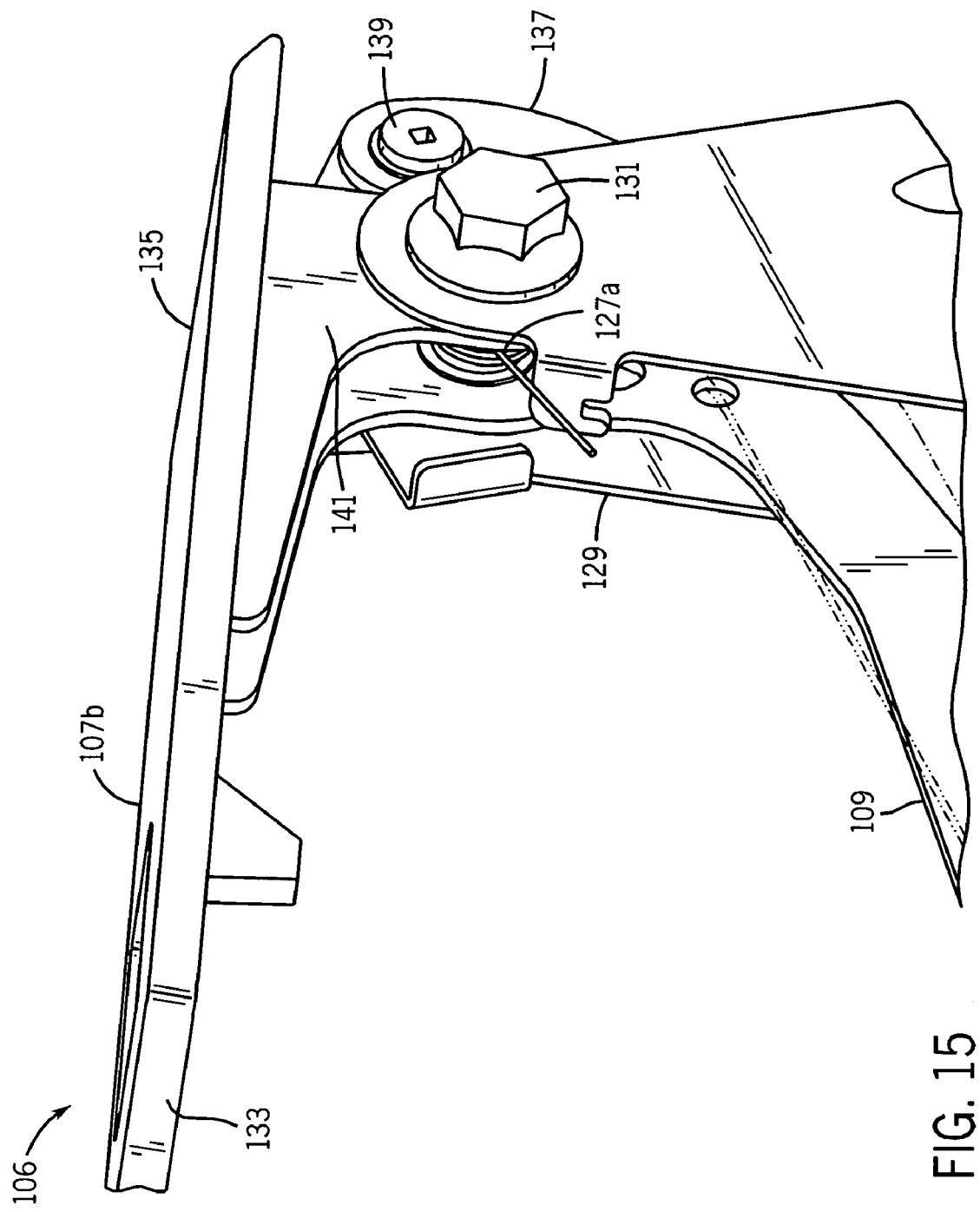
FIG. 15 is a partial perspective view of the lifting assembly showing the returning means and the attachment arm of the handle bolted to the bracket.

The vehicle seat assembly 101 comprises a lift assembly 106 functionally and structurally in communication with the vehicle seat 103. The lift assembly 106 comprises a handle 107, an actuator member 109 interconnecting the handle 107 with the vehicle seat 103, and a lift mechanism 111. The lift mechanism 111 serves to transfer the motion of the handle 107 to the seatback 104, thereby lifting the seatback 104. The handle 107 is pivotally mounted on a support bracket 129. In one embodiment, the handle 107 has two ends, a first end 133 being nearest the seat and a second end 135 being further from the vehicle seat 103. The handle 107 is pivotally mounted, such as via a bolt 131, to a support bracket 129 at a location on the handle near, but not at, the second end 135 so that a portion of the handle 107 pivots down and towards the vehicle seat 103 as the handle 107 is lifted up and away from the vehicle seat 103. In one embodiment, as best shown in FIG. 15, the handle 107 includes a lower protruding portion 141 which is pivotally mounted to the support bracket 129 via a mounting means 131 such as a bolt. The handle 107 has at least two positions, a resting position and a lift position. When the handle 107 is in the resting position, the lift assembly 106 is not engaging the seatback 104 to return to an upright position. As the handle 107 moves from the resting position (FIG. 5) to the lift position (FIG. 6), the actuator member 109 is engaged and actuates the lift mechanism 111 to lift the seatback 104 to the upright position.

The handle 107 may be of any design known in the art which will allow a user to actuate the lifting assembly 106 of the present invention. The cylindrically shaped handle 107a may, in one embodiment, have a cover 149 for providing a gripping surface to a user similar to a parking brake handle for a vehicle. In another exemplary embodiment, illustrated in FIGS. 5-15, the handle 107 is rectangularly shaped. The rectangularly shaped handle 107b may have a gripping portion 148 for providing a user with an area for holding the rectangularly shaped handle 107b during actuation of the lift assembly 106.

In one embodiment, the handle 107 is disposed in a housing 110 with the actuator member 109 in communication with the second end 135 of the handle 107 wherein the first end 133 of the handle 107 is capable of being moved to the lift position. The handle 107 may also comprise a means for returning 127 the handle 107 from the lift position to the resting position. The returning means 127 comprise, for example but not limited to, any known or appropriate springs, elastomeric members, cantilevered or flexible members, or any combinations thereof which function to return the handle 107 to the resting position from the lift position. In a preferred embodiment as shown in FIG. 15, a coiled spring 127a is utilized as the returning means 127. The coiled spring 127a acts as a bias to exert force on the handle 107 for returning the handle to the resting position.

In a preferred embodiment, a vehicle seat assembly 101 in accordance with the principles of the present invention has a release mechanism 108 for releasing the lock mechanism 143 when the position of the seatback 104 is locked. When the release mechanism 108 is activated, the locking mechanism 143 is released and the recliner mechanism 114 is free to operate and the seatback 104 may be moved, such as from the folded position to the upright position. In one embodiment, the release mechanism 108 is in communication with a release handle 150 for actuating the release mechanism 108 and which may be located on the vehicle seat 103 or other convenient location but is disclosed as preferably being located on an aft face of the seatback 104. The handle 107 preferably includes an electronic switch or other similar device such as a depressible button 112 which is electronically connected with the release mechanism 108 such that when the button 112 is pressed by the user, the release mechanism 108 is activated to release the recliner mechanism 114 thereby and releasing the seatback 104 from a locked state.

The actuator member 109 is in communication with the seatback 104 via, for example but not limited to, a direct structural connection such as weld or a bolt, or by a lifting mechanism 111, when the actuator member 109 is itself engaged by the handle 107. In one embodiment, the actuator member 109 is moved towards the vehicle seat 103 as the handle 107 is moved from its rest position toward the lift position. In one embodiment, the actuator member 109 is an elongated plate having an upwardly curved portion 137 (in the direction of the ceiling of the vehicle when in use), the curved portion 137 is preferably rigidly affixed to the second end 135 of the handle. The actuator member is secured to the handle via a connection means 139 such as but not limited to a bolt. The handle 107 is in communication with the actuator member 109 whereby the actuator member 109 transfers the motion of the handle 107 to the seatback 104 as the handle 107 is moved from the rest position to the lift position.

In one embodiment, the lifting mechanism 111 includes a first arm 113. The first arm 113 preferably includes a pivot point 117. Preferably, the first arm 113 is generally "L-shaped" but may be alternatively shaped provided it will function to engage the seatback 104. In some embodiments, the lift mechanism 111 is adapted to releasably engage a stop member 119, such as a bolt or other appropriate mechanical structure, on the seatback 104 in a groove or recess 121 located in the lift mechanism 111. The vehicle seat 103 also optionally but preferably includes a biasing member (not shown) for biasing the seatback 104, such a spring or other known or appropriate biasing device for providing force to assist the vehicle seat 103 from the folded position toward the upright position.

The vehicle seat is operated according to a method which includes moving the handle 107 from the resting position toward the lift position. As the handle 107 is raised to the lift position, the handle 107 being connected to the actuator member 109 causes the actuator member 109 to be engaged and moves the actuator member 109. When the actuator member 109 is engaged, it moves toward the vehicle seat 103 and engages the first arm 113 of the lifting mechanism 111. This causes the first arm 113 to rotate about its pivot point 117 so that the first arm 113 rotates towards the back of the vehicle seat 103. As the first arm 113 rotates, the first arm 113 engages the seatback 104 when a recess 121 comes into contact with a stop member 119 on the seatback 104. The motion of the first arm 113 as it rotates about its pivot point 117 is transferred to the seatback 104, thus raising the seatback 104 from the folded position to the upright position.

It should be understood that various changes and modifications to the embodiments described herein would be apparent to those skilled in the art. For example, a vehicle seat assembly of the preferred embodiment may utilize a foldable bench-type seat, as is typically situated behind the driver's and front passenger's seats in mini-vans, sport-utility vehicles, and the like. However, the present invention can be used with any type of seat, including captain-style vehicle seats. In addition, although the actuator member 109 is illustrated as being a bar in the FIGURES, the actuator member may be of any known or appropriate shape for communicating a force applied to the handle 107 to the seatback 104. Such changes and modifications can be made without departing from the spirit and scope of the present invention and without demising its attendant advantages.

What is claimed is:

1. A vehicle seat comprising:
   a seatback foldably connected about a pivot axis to a seat bottom;
   a lifting assembly positioned aft of the vehicle seat and having a handle and an actuator member, the handle having a first end and a second end, the handle being pivotally mounted at a pivot point closer to the second end than the first end;
   the actuator member having a first end movable with the second end of the handle and a second end for moving the seatback;
   an arm connecting the actuator member to the seatback, the arm being pivotally connected to the seat; and
   wherein pivotal motion of the handle is transferred via the actuator member to the seatback to lift the seatback to an upright position.

2. The vehicle seat of claim 1, further comprising a locking mechanism to selectively restrict movement of the seatback relative to the seat bottom.

3. The vehicle seat of claim 2, further comprising a release mechanism to selectively release the locking mechanism.

4. The vehicle seat of claim 3, further comprising a release handle positioned on the seat and in communication with the release mechanism for selectively releasing the locking mechanism.

5. The vehicle seat of claim 4 wherein the handle comprises an actuation mechanism which is in electronic communication with the release mechanism to provide for release of the locking mechanism upon actuation of a button.

6. The vehicle seat of claim 1 further comprising a housing, the handle disposed in the housing.

7. The vehicle seat of claim 1 wherein the handle is operatively connected to a biasing mechanism for biasing the handle to a resting position.

8. The vehicle seat of claim 1, the arm having a first portion for engaging the actuator member and a second portion substantially perpendicular thereto and forming an L-shape, the second portion for engaging the seatback.

9. The vehicle seat of claim 8 further comprising a stop for restricting the range of motion of the arm.

10. The vehicle seat of claim 9 wherein the L-shaped arm is rotatably fixed to the seatback at a junction of the first portion and the second portion.

11. The vehicle seat of claim 10 further comprising an outcropping on the seatback for engagement by the second portion of the L-shaped arm.

12. A vehicle seat comprising:
   a seatback foldably connected about a pivot axis to a seat bottom;
   a lift assembly comprising:
      a handle to be positioned substantially aft of and perpendicular to the seatback and having a first end and a second end; the handle having a pivot located between its first and second ends for mounting to a bracket at a mounting point; the handle having a portion of its second end for protruding beyond the mounting point in a direction away from the seatback;
      an actuator member having a first end engaging the protruding portion of the second end of the handle; and
      an arm connecting the actuator member to the seatback, the arm for being pivotally fixed to the seat and rotatable about the pivot axis; wherein, when the first end of the handle is moved, the actuator member is engaged by the protruding portion for moving the seatback.

13. The vehicle seat of claim 12, the lift assembly further comprising a housing in which the handle is disposed.

14. The vehicle seat of claim 12, wherein the handle is operatively connected to a biasing mechanism whereby the handle is biased in a direction toward a resting position.

* * * * *